Dec. 4, 1962 R. J. HOLTON 3,066,900
FASTENING DEVICES
Filed April 13, 1961 2 Sheets-Sheet 1

INVENTOR.
ROBERT J. HOLTON
BY Teare, Fetzer & Teare

Dec. 4, 1962  R. J. HOLTON  3,066,900
FASTENING DEVICES

Filed April 13, 1961  2 Sheets-Sheet 2

INVENTOR.
ROBERT J. HOLTON
BY Teare, Fetzer & Teare

United States Patent Office 3,066,900
Patented Dec. 4, 1962

3,066,900
FASTENING DEVICES
Robert J. Holton, Cleveland, Ohio, assignor to Tinnerman Products, Inc., Cleveland, Ohio, a corporation of Ohio
Filed Apr. 13, 1961, Ser. No. 102,763
9 Claims. (Cl. 248—73)

This invention relates in general to fastener means for mounting cables, conduits, electrical conductors, tube lines, rods and like elongated objects in place, and in stress relieved relation, upon an apertured support, such as a panel.

More particularly, the invention is directed to spring-clip devices constructed from relatively thin spring-like material of sheet or strip form, such as sheet spring steel, sheet metal, cold rolled metal, and designed for use in combination with conduits, cables and like elongated objects, for positively mounting the same in applied position on a support, without danger of loosening or accidental removal incident to vibration, jarring and strain which may take place in the supporting member. The fastener clip of the invention also provides means for readily and quickly attaching and/or detaching the object or conduit to and from the clip to greatly facilitate its useability.

A specific illustration of the use to which the clip devices of this invention may be put is the mounting of conduits, cables and the like as employed in electrical appliance wiring. In mounting such wiring, it is desirable that the clip be capable of being easily and quickly applied in firm engagement and in applied position on the supporting part or frame, and likewise it is desirable that the electrical wiring be easily and readily attached to the clip, and also that the wiring can be fairly readily removed from assembled relation with the clip, when so desired.

In the instant arrangement, the clip comprises a contractible, resilient-like, panel attaching portion including a shank or bayonet portion depending from said attaching portion and adapted to be received in generally snap-fastening relation in an aperture in the supporting panel or part, for securing the clip to the panel, together with a cable or electrical wire clamping section extending from the attaching portion, for holding the electrical wiring or conduit, and which wire holding section includes means for rapidly attaching in secure relation the electrical wiring to the clip, and for just as rapidly removing the electrical wiring from the clip, without disturbing the assembled relationship of the clip on the supporting panel.

The invention, therefore, contemplates the provision of a novel, relatively inexpensive clip device, which may be manufactured from spring-like strip material, for holding in readily detachable relationship cables, conduits and the like, on an apertured supporting wall or panel.

Another object of the invention is to provide fastening means for mounting cables and the like on an apertured supporting panel, and embodied in the form of a clip device having a relatively yieldable shank portion including holding means on the shank portion for snap fastening relation with the underside of the panel, for readily mounting the clip on the panel, and including a depending tongue portion receivable through the aperture in the panel and adapted for camming, abutting engagement with the shank portion, for maintaining the latter in interlocked relation with the supporting panel, and with the clip embodying an electrical wire holding portion, which last mentioned portion includes means for rapidly inserting the electrical wiring in assembled relation with the clip and for just as rapidly removing the electrical wiring from such assembled relation, when so desired.

A more specific object of the invention is to provide a fastening clip comprising a resilient, contractible loop or reverse bend, panel attaching portion including a yieldable shank portion depending from the upper side of the attaching portion, and a more or less rigid tongue portion depending from the lower side of the attaching portion, and adapted for camming abutting coaction with the shank portion, with said shank portion and tongue portion being adapted to be received through an aperture in the supporting part or panel, and with the shank portion including holding means thereon adapted for snap fastening relation with the underside of the supporting panel, together with a generally inverted U-shaped electrical wire or cable clamping portion extending outwardly from said attaching portion for detachable clamping the electrical wiring against the supporting panel, and including lever means on said clamping portion for readily attaching and detaching the wiring from the clip without disturbing the attached condition of the clip to the supporting panel.

Other features and advantages of the invention will be apparent from the consideration of the following description taken in conjunction with the accompanying drawings wherein.

Figure 1:
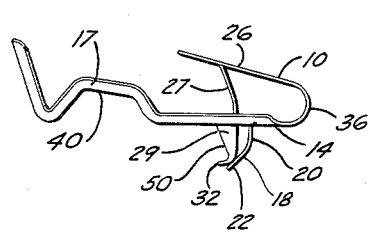
FIG. 1 is an enlarged, side elevational view of one embodiment of the clip device of the invention.
Figure 2:
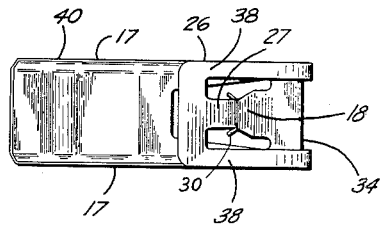
FIG. 2 is a top plan view of the clip of FIG. 1.
Figure 3:
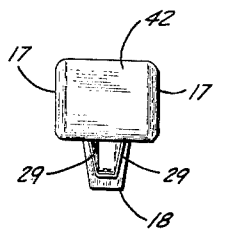
FIG. 3 is an end elevational view taken from the left hand side of FIG. 1.
Figure 4:
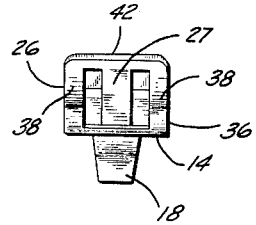
FIG. 4 is an end elevational view taken from the other side of FIG. 1.
Figure 5:
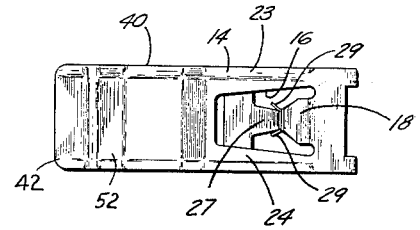
FIG. 5 is a bottom plan view of the clip device of FIG. 1.
Figure 6:
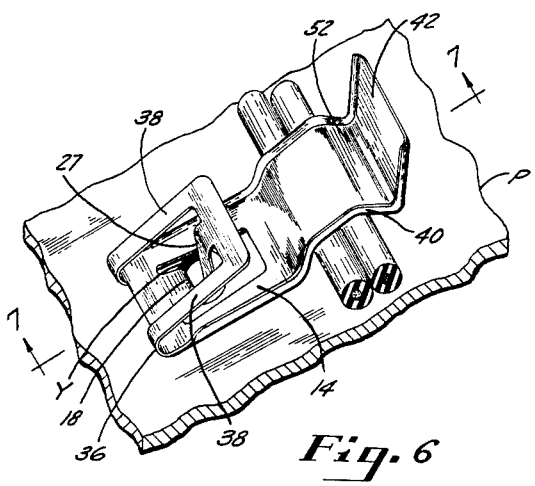
FIG. 6 is a perspective view showing the clip device in applied position on a supporting part or panel, and mounting electrical conduit thereon.
Figure 7:
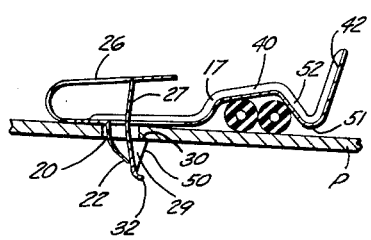
FIG. 7 is a vertical sectional view taken generally along the plane of line 7—7 of FIG. 6 looking in the direction of the arrows.

Referring again to the drawings and in particular to FIGS. 1 to 7 thereof, in carrying out the invention, the securing device or clip may be formed from a strip section or stamped blank of spring-like sheet material, such as spring steel, cold rolled metal, sheet metal and the like, and the strip may be bent, as shown, to provide a somewhat elongated, loop-like panel attaching portion 10 which is adapted for securing the clip to an apertured supporting panel P. The attaching portion 10 comprises a base section 14 which is partially severed, as at 16, through the greater portion of its length, to provide a depending, more or less rigid tongue 18. The tongue 18 comprises an upper portion 20, which is disposed generally normal to the plane of the base section 14, and a lower portion 22 which extends diagonally downwardly and forwardly with respect to the upper portion 20 and for a purpose to be hereinafter described. It will be noted that the partially severed portion 16 provides an opening through the base section, partially defined by elongated, side sections 23 and 24 which extend rearwardly of the aforementioned tongue 18. The upper lever section 26 of the attaching portion 10 is partially severed to provide a depending, yieldable shank or bayonet portion 27 adjacent its forward end, which is adapted for camming coaction with the aforementioned tongue 18 and in a manner to be hereinafter set forth. The shank portion is of increased width at its bottom section and in this connection comprises side wings 29 which define upwardly facing abutments 30 adapted for snap-fastening coaction with the underside of the supporting panel when the clip is in mounted relation on the panel. The lower extremity of the shank below wings 29 is turned diagonally downwardly and forwardly, as shown at 32, to provide for smooth camming coaction between the bottom extremity of the tongue and the bottom extremity of the shank during assembly of the clip on a panel. It will be noted that except for the shank 27, the material of upper section 26 has been very substantially removed, and to a point 34 preferably completely around the return bend section 36 of attaching portion 10, down to the base section 14. In other words, the sides of upper section 26 are defined by relatively narrow sections or strips 38 which gives a high degree of resiliency to upper section 26, for a purpose to be hereinafter described.

Projecting forwardly from the attaching portion 10 is a cable or electrical wire receiving or clamping section 40 and with such clamping portion being of generally inverted U-shaped configuration, for clamping or holding coaction with the cable or electrical wire element or other elongated object. The forward end of the cable clamping section 40 is provided with a camming or lever portion 42 extending diagonally upwardly in a forward direction, which is adapted for camming coaction with the cable or wire for readily mounting the cable in the clip's wire holding section 40. Portion 42 also provides for convenient lifting of the holding section 40 by a finger of a workman for insertion of the cable or wire therein as an alternate method of assembly of the cable to the clip. In the free or non-assembled condition of the clip as shown in FIG. 1, the upper and lower sections 26 and 14 of attaching portion 10 generally diverge with respect to one another, and the free end of the shank 27 is disposed in preferably abutting relation adjacent the free end of the tongue 18. The side edges of the base section 14 and of clamping section 40 are generally turned or bent outwardly as at 17 to provide strength and increase the rigidity of such sections.

To secure the clip to the supporting panel or part, the necessary holes or openings are provided in the support P in the position which it is desired that the objects to be mounted, such as the wire, cable etc. shall extend. The holes Y are preferably circular which provide the most economical arrangement for so forming the holes. With the clip in its free position, as shown in FIG. 1, the tongue and associated shank are fed into one of the holes Y, and then the lever section 26 is forced downwardly toward the base section 14 of the attaching portion until the wings 29 pass beneath the underside of the supporting panel into snap-fastening, holding coaction with the peripheral edge of the opening Y in the panel. As can be best seen in FIG. 1 of the drawings, the outer side edges 50 of the wings extend diagonally upwardly with such side edges engaging in camming coaction with the defining edge of the opening Y in the support, to force the yieldable shank 27 rearwardly against the more or less rigid tongue 18 during downward movement of the shank through the opening Y. During this movement, the tongue 18 may be forced slightly rearwardly by the shank to permit passage of the wings 29 through the opening in the panel. As soon as the wings clear the opening, the tongue 18 acts to definitely move the abutments 30 on the wings into overlapping relation with the underside of the support panel, and acts to maintain such interlocked relationship by the abutting engagement of the lower free extremity of the tongue with the confronting surface of the shank. The aforementioned forwardly turned portion 32 on the lower end of the shank insures a smooth camming coaction between the free end of the shank and the tongue during downward movement of the shank through the opening. In the aforedescribed secured portion of the clip on the panel, the engagement of the shank with its confronting edge section of opening Y prevents lengthwise movement of the clip in one direction, and the engagement of the tongue with its confronting edge section of opening Y prevents lengthwise movement of the clip in the opposite direction, as well as preventing linear transverse movement of the clip with respect to the panel.

In order to attach a wire or cable or other elongated object to the clamping portion 40, the wire may be merely forced against the camming or lever section 42, which causes upward movement of the clamping portion 40 and base section 14 of the clip, until the wire moves into the U-shaped clamping section, at which time the resiliency of the clip snaps the clamping section into positive clamping coaction with the wire. The aforementioned relatively great resiliency of the upper lever section 26 of the attaching portion, permits the base section 14 and the associated clamping section 40 to pivot more or less as a unit about fulcrum lines defined by the juncture of the upper lever section with the base section, and yet the tensioned relationship of the upper lever section held by the interlocking coaction between the shank and the underside of the support panel, causes the clamping section 40 and associated base section 14 to snap back into positive holding relation with the wire or cable, to thus hold the latter in positive assembled relation on the support panel. As aforementioned, instead of merely pushing the wire against the lever on the clamping section, a workman may apply pressure and as by means of a finger, to the lever section 42, thereby lifting the clamping section and base section upwardly as aforedescribed, and then shoving the wire underneath the clamping section, and then releasing the lever section 42, whereupon the clamping section will snap back into holding coaction with the wire. The U-shaped clamping section is preferably of such size that when it it clamping a wire or cable, the bottom extremity 51 of the U-shaped section is disposed slightly above the confronting surface of the support panel, thereby insuring a tight holding coaction of the wire in the clamping section.

Moreover, the outer side leg 52 of the U-shaped clamping section preferably diverges forwardly in a downward direction so that if it is desired to detach the wire from the clamping section, the workman may merely grasp the wire on one or both sides of the clamping section 40 and pull outwardly on the wire, and the wire, engaging in camming coaction with the leg 52, forces the clamping section and associated base section upwardly, permitting ready passage of the wire out of the clamping section, or the workman may merely grasp the lever 42 with a finger to move the clamping section and base section upwardly, to permit ready disengagement of the wire from the clamping section. The wire pulling method of removal is especially advantageous if only one hand of the workman happens to be free.

Figure 8:
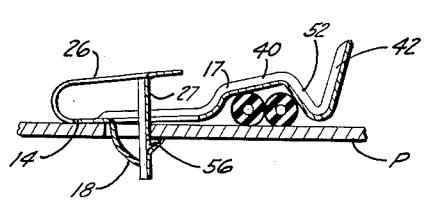
FIG. 8 is a view generally similar to FIG. 7, but illustrating a modified form of the invention.
Figure 9:
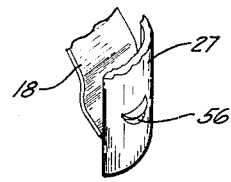
FIG. 9 is a fragmentary perspective view of the shank and tongue portions of the clip of FIG. 8.

In FIGS. 8 and 9 there is disclosed a modification of the shank portion of the clip with the shank portion being of generally arcuate convex configuration in horizontal cross section, as illustrated, for more or less surface-to-surface engagement with the confronting defining arcuate surface of the opening in the panel, and with an abutment 56 being struck from the shank portion centrally thereof, which abutment is adapted for snap fastening coaction with the underside of the support panel in a generally similar manner as that aforedescribed in connection with the wings on the first described embodiment of the invention.

Figure 10:
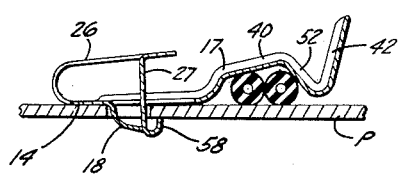
FIG. 10 is a view generally similar to that of FIG. 8, but illustrating a further modified form of the invention.
Figure 11:
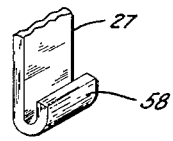
FIG. 11 is a fragmentary perspective view of the shank portion of the clip of FIG. 10.

In FIGS. 10 and 11 there is shown a further modification of the shank portion of the clip wherein the shank is in the form of a J-shape for overlapping snap-fastening coaction with the underside of the panel, to hold the clip on the panel. The curved portion 58 of the J-shank serves to cam against the confronting surface of the opening in the support panel during passage of the shank through such opening.

From the foregoing description and accompanying drawings it will be seen that the invention provides a novel clip arrangement which may be readily mounted in attached relation to an apertured panel, and wherein there is provided a clamping section on the clip for positively holding the cable, wire or other object, in assembled relation with the clip, but which can be readily actuated to permit removal of the wire or cable from the clip and without disturbing the assembled relation of the clip on the panel.

The terms and expressions which have been employed are used as terms of description and not of limitation, and there is no intention in the use of such terms and expressions of excluding any equivalents of any of the features described or shown, or portions thereof, but it is recognized that various modifications are possible within the scope of the invention claimed.

I claim:

1. A clip for mounting an elongated article, such as a cable and the like, on an apertured support, comprising a strip of resilient material reversely bent adjacent the rearward end thereof to provide a rearwardly disposed panel attaching portion including a base section adapted for abutting engagement with one side of the support and a resilient lever section overlapping said base section, said lever section including a depending shank extending toward said base section and adapted for movement through the aperture in the support upon predetermined contraction of said lever section, said base section having an opening therethrough for passage of the shank therethrough, said shank having means thereon adapted for snap fastening engagement with the other side of the support upon predetermined movement of said shank through the aperture in the support, generally rigid means extending from said base section and adapted to extend through the aperture in the support in coacting relation with said shank to maintain said clip in secured relation on the support, and an article clamping portion projecting forwardly from said base section of said panel attaching portion and adapted to releasably clamp an article against the support, said article clamping portion being of inverted generally hook-shaped configuration open on the underside thereof and including at its forwardmost end a diagonally forwardly and upwardly sloping cam section adapted for camming coaction with the article to cause upward movement of said article clamping portion and said base section as a unit away from the support for movement of the article into clamped condition in said clamping portion and directly against the support.

2. A clip in accordance with claim 1 wherein said means or said shank comprises transversely spaced wings extending generally laterally from the respective side of said shank, said wings defining upwardly facing generally forwardly extending abutments adapted for snap fastening engagement with the other side of the peripheral edge of the aperture in the support, to hold the clip in secured relation on the support, each of said wings below the respective abutment comprising a diagonally upwardly and forwardly extending edge adapted for camming coaction with the peripheral defining surface of the aperture in the support upon movement of the shank through the aperture.

3. A clip in accordance with claim 1, wherein said shank has a forward turned configuration at its lower end adapted for camming coaction with said extending means during movement of said shank through the aperture in the support.

4. A clip in accordance with claim 1, wherein said shank is of arcuate configuration in horizontal cross section and is bowed forwardly, and is adapted for generally surface-to-surface engagement with the defining surface of an arcuate shaped aperture in the support.

5. A clip in accordance with claim 1, wherein said shank is of J-shape in side elevation, the curved bottom end portion of said J-shaped shank being adapted for camming coaction with the defining surface of the aperture in the support upon movement of the shank through the aperture in the support to attach the clip to the support.

6. A clip for mounting an elongated article, such as a cable or the like, on an apertured support, comprising a strip of resilient material, such as sheet metal, reversely bent adjacent the rearward end thereof to form a rearwardly disposed panel attaching portion including a base section adapted for abutting engagement with the support and a resilient lever section overlying the base section, said lever section including a depending shank extending toward said base section and adapted for movement through the aperture in the support upon predetermined compression of said lever section, said base section having an opening therethrough underlying said shank, said shank having abutment means thereon adapted for snap fastening engagement with the underside of the support at the peripheral edge of the aperture in the support, upon predetermined movement of the shank through the aperture, said abutment means comprising diagonally upwardly and forwardly extending wings on the sides of said shank commencing substantially at the lower end thereof and terminating below the upper end thereof to form generally horizontal abutment surfaces adapted for engagement with the underside of the support, a generally rigid tongue depending from said base section and extending diagonally toward said shank and adapted for camming coaction therewith during movement of the shank through the opening in the base section and the aperture in the support, an article clamping portion projecting forwardly from and being integrally formed with said base section of said panel attaching portion and adapted to releasably clamp an article against the support, said last mentioned portion being of generally inverted U-shaped configuration in side elevation and including an upwardly and forwardly projecting tab portion providing a forwardly facing cam surface adapted for camming engagement with the article for readily moving the clamping portion and said base section upwardly away from the support to permit ready insertion of the article into said clamping portion, and continuous strengthening means extending lengthwise along said clamping portion and said base section for rigidifying the last mentioned portion and section as a unit.

7. A clip in accordance with claim 6, wherein the forwardmost leg of the inverted U-shaped clamping portion is directed in a diagonally downwardly and forwardly direction to provide a rearwardly facing camming surface adapted for engagement with the article when mounted in the clamping portion for readily moving the clamping portion and base section upwardly away from the support, to permit ready release of the article from the support.

8. A clip for mounting an elongated article, such as a cable, on an apertured support, comprising a strip of resilient material such as sheet metal, reversely bent adjacent the rearward end thereof, to provide a rearwardly disposed attaching portion including a generally planar base section adapted for abutting engagement with the support and a generally planar resilient lever section overlapping the base section, said lever section being severed through the greater portion of its length thereof and including a depending shank extending toward said base section and adapted for movement through the aperture in the support upon predetermined contraction of said lever section, said lever section being defined on the sides thereof by relatively narrow strips of the resilient material thereby giving a high degree of resilience to said lever section and with such strips extending around the reverse bend of the attaching portion to a juncture with said base section, said base section having an opening therethrough aligned with said shank with the latter extending through said opening and below said base section, a generally rigid tongue depending from said base section in a diagonally forward direction and engaging said shank adjacent its lower end, said shank having upwardly and forwardly extending wings on the sides thereof defining generally horizontal abutment means thereon projecting generally forwardly and adapted for snap fastening engagement with the underside of the support upon predetermined movement of the shank through the aperture in the support, an article clamping portion projecting forwardly from and being integrally formed with said base section of said attaching portion in generally rigid relation to said base section and adapted to releasably clamp an article against the support, strengthening ribs extending lengthwise along the upper surface of said attaching portion and said base section for rigidifying the last mentioned portion and section as a unit, said article clamping portion being of generally inverted U-shaped configuration and including a diagonally forwardly and upwardly extending tab at its outer end, said tab providing a forwardly facing cam surface adapted for engagement with the article for actuation of the clamping portion and associated base section to lift the latter outwardly away from the support commencing at the juncture of said strips with said base section, to permit ready insertion of the article into the clamping portion, the forwardmost leg of said U-shaped clamping portion having a rearwardly facing cam surface sloping forwardly and downwardly and adapted for camming coaction with the article, to lift the clamping portion and associated base section upwardly away from the support commencing at the juncture of said strips with said base section, to permit ready removal of the article from the clamping portion.

9. In combination, an apertured support and a clip for mounting an elongated article such as a cable on the support, said clip being formed of a strip of resilient material and being reversely bent adjacent the rearward end thereof, to provide a rearwardly disposed panel attaching portion including a base section disposed in abutting engagement with the support over said aperture, and a resilient lever section overlying the base section, said lever section including a depending shank extending toward said base section, said base section including an opening therein underlying said shank, said shank extending through said opening and through said aperture in the support, upwardly and forwardly extending wings on the sides of said shank commencing adjacent the bottom extremity of the shank and terminating below the base section, providing generally horizontal abutment means on said shank disposed in snap fastening interlocking relation with the underside of the support at the peripheral edge of said aperture, a generally rigid, diagonally forwardly extending tongue depending from said base section and extending through the aperture in the support, said tongue at its lower end being disposed in abutting relation with said shank to maintain said abutment means on said shank in coupled relation with the underside of the support, said tongue and said shank coacting with respect to defining edge portions of said aperture in said support to prevent relative lengthwise and transverse movement of said clip on said support, an article clamping portion projecting forwardly from and integrally formed with said base section of said panel attaching portion, said article clamping portion being of generally inverted U-shaped configuration in side elevation and being adapted to releasably clamp an article against the supporting panel, said article clamping portion including a diagonally upwardly and forwardly extending tab on its forwardmost end, said tab providing a forwardly facing cam surface adapted for engagement with the article to raise said article clamping portion and associated base section upwardly away from said support for ready insertion of an article into said clamping portion, the forwardmost leg of said inverted U-shaped clamping portion extending diagonally forwardly and downwardly to provide a rearwardly facing cam surface adapted for engagement with the article to raise said article clamping portion and associated base section upwardly away from said support for ready removal of the article from said clamping portion.

References Cited in the file of this patent

UNITED STATES PATENTS

| 2,454,894 | Tatom | Nov. 30, 1948 |
| 2,618,033 | Tinnerman et al. | Nov. 18, 1952 |
| 2,720,289 | Henrickson | Oct. 11, 1955 |
| 2,723,432 | Flora | Nov. 15, 1955 |
| 2,941,768 | Elms et al. | June 21, 1960 |

FOREIGN PATENTS

| 713,575 | Great Britain | Aug. 11, 1954 |